(12) United States Patent
Fujiwara

(10) Patent No.: US 7,522,187 B2
(45) Date of Patent: *Apr. 21, 2009

(54) IMAGE SENSING APPARATUS AND METHOD HAVING HIGH AND LOW RESOLUTION TRANSFER MODES

(75) Inventor: Hideyuki Fujiwara, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 683 days.

This patent is subject to a terminal disclaimer.

(21) Appl. No.: 10/318,053

(22) Filed: Dec. 13, 2002

(65) Prior Publication Data

US 2003/0085988 A1 May 8, 2003

Related U.S. Application Data

(62) Division of application No. 09/246,169, filed on Feb. 8, 1999, now Pat. No. 6,583,809.

(30) Foreign Application Priority Data

Feb. 27, 1998 (JP) ................................. 10-047425

(51) Int. Cl.
*H04N 5/225* (2006.01)
(52) U.S. Cl. .............................. 348/207.11; 348/14.12; 348/220.1; 348/211.1
(58) Field of Classification Search ............ 348/207.99, 348/14.12–15, 231.6, 222.1, 207.1, 207.11, 348/211.1, 220.1; 358/1.15
See application file for complete search history.

(56) References Cited

U.S. PATENT DOCUMENTS 4,819,059 A 4/1989 Pape
5,260,783 A 11/1993 Dixit
5,751,445 A 5/1998 Masunaga (Continued)

FOREIGN PATENT DOCUMENTS

EP 0 825 784 A2 2/1998

(Continued)

OTHER PUBLICATIONS

Patent Abstracts of Japan, vol. 017, No. 710 (E-1484), Dec. 24, 1993 & JP 05 244553 A (Canon Inc), Sep. 21, 1993.

(Continued)

*Primary Examiner*—Lin Ye
*Assistant Examiner*—Gevell Selby
(74) *Attorney, Agent, or Firm*—Fitzpatrick, Cella, Harper & Scinto

(57) ABSTRACT

An image input apparatus includes an image data generating unit, a data transfer unit and a control unit. The image data generating unit generates high resolution image data if the image input apparatus is in a high-resolution image mode, and generates low resolution image data if the image input apparatus is in a low resolution image mode. The data transfer unit tranfers the high resolution image data to an external device in an asynchronous or bulk transfer mode, and transfers the low resolution image data to the external device in an isochronous transfer mode. The control unit changes the low-resolution image mode to the high-resolution image mode, if an instruction for selecting the high-resolution image mode is received from the external device during the transfer of the low resolution image data.

9 Claims, 12 Drawing Sheets

U.S. PATENT DOCUMENTS

| | | | |
|---|---|---|---|
| 5,796,957 A | | 8/1998 | Yamamoto et al. |
| 5,801,842 A | | 9/1998 | Medina |
| 5,847,752 A | | 12/1998 | Sebestyen |
| 5,969,750 A | | 10/1999 | Hsieh et al. |
| 6,005,613 A | * | 12/1999 | Endsley et al. ............ 348/231.6 |
| 6,130,710 A | * | 10/2000 | Yasuda .................... 348/220.1 |
| 6,195,125 B1 | * | 2/2001 | Udagawa et al. ......... 348/222.1 |
| 6,384,928 B2 | * | 5/2002 | Nagasawa et al. .......... 358/1.15 |
| 6,400,392 B1 | | 6/2002 | Yamaguchi et al. |
| 6,453,071 B2 | * | 9/2002 | Ito et al. .................... 382/232 |
| 6,580,827 B2 | * | 6/2003 | Ueda ......................... 382/232 |

FOREIGN PATENT DOCUMENTS

| | | |
|---|---|---|
| JP | 08088785 | 4/1996 |
| JP | 10136245 | 5/1998 |
| KR | 1999-54501 | 7/1999 |

OTHER PUBLICATIONS

Patent Abstracts of Japan, vol. 1997, No. 1, Jan. 31, 1997 & JP 08 242433 A (Hitachi Ltd), Sep. 17, 1996.

* cited by examiner

FIG. 6
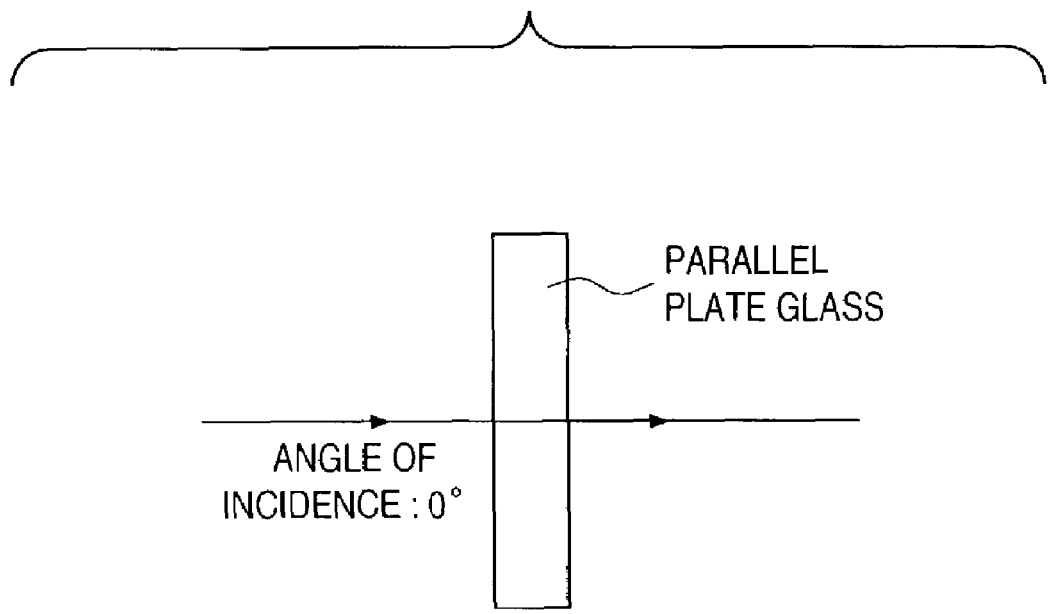
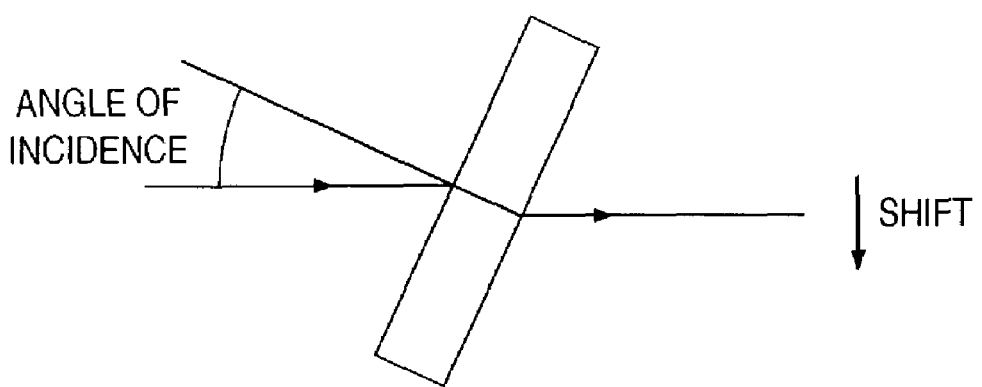

FIG. 7
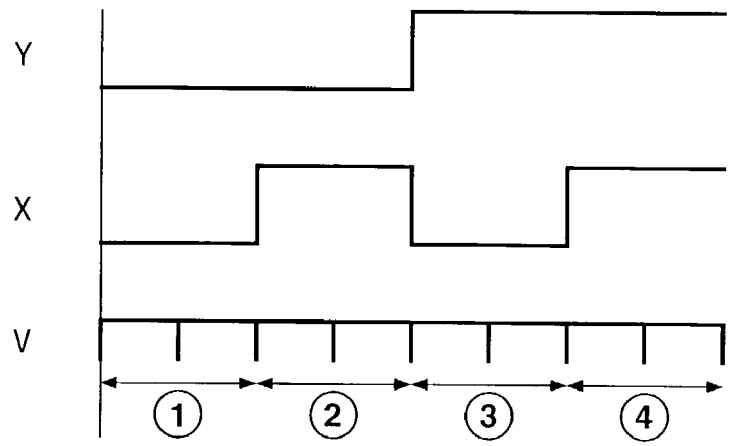
FIG. 8
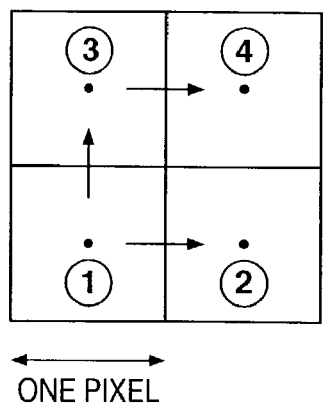
ONE PIXEL
FIG. 9
| G | R | G | R |
|---|---|---|---|
| B | G | B | G |
| G | R | G | R |
| B | G | B | G |

FOUR FRAMES
OF DATA FROM CCD

IMAGE SENSING APPARATUS AND METHOD HAVING HIGH AND LOW RESOLUTION TRANSFER MODES

CROSS REFERENCE TO RELATED APPLICATION

This application is a division of application Ser. No. 09/246,169, filed Feb. 8, 1999, now U.S. Pat. No. 6,583,809.

BACKGROUND OF THE INVENTION

This invention relates to an image input apparatus, system, method and storage medium for inputting high-resolution and low-resolution images to a personal computer, for example. The invention further relates to an image sending/receiving system using a low-resolution/high-resolution image input apparatus.

FIG. 13 is an external view of a videoconference system according to the prior art. The system includes a host personal computer 101 having a display 102, and a video camera unit 103, which is capable of being controlled by the host personal computer 101, for inputting moving images to the host personal computer 101. The video camera unit 103 is mounted on a pan head 110. An integrated cable 104 connects the host personal computer 101 to the video camera unit 103. The host personal computer 101 has a keyboard 105, a mouse (pointing device) 106, a microphone set 107 and a communications cable 108.

FIG. 14 is a block diagram showing the flow of various signal in the system of FIG. 13.

Shown in FIG. 14 are the video camera unit 103 and pan head 110. An expansion board 111 for the host personal computer 101 is connected to a PCI bus of the host personal computer 101.

The video camera unit 103 comprises a lens unit 112, a lens-unit driver 113, an image sensing device (e.g., a CCD) 114, a correlated double sampling circuit 115, an automatic gain control circuit 116, an adder 117, a timing generator 118, a processing circuit [referred to as a VIDS (Vertical Interval Data Signal)] 119 for sending and receiving data in a video vertical blanking interval, a microprocessor 120, a microphone 121 and a microphone amplifier 122.

The expansion board 111 of the host personal computer 101 comprises an A/D converter 123, a camera process circuit 124, a video process circuit 125, a multiplexer/demultiplexer 126 for multiplexing and demultiplexing data, audio and images, a PCI bus controller 127, a processing circuit (VIDS) 128 for sending and receiving data in a video vertical blanking interval, a synchronizing signal generator (SSG) 129, a microprocessor 130, an audio A/D converter 131, an audio D/A converter 132, and an audio process circuit 133.

A CPU 134 constitutes a host computer system including a chip set and a memory, etc., and has a hard disk (HDD) 135 connected thereto via an IDE interface. Applications for image input and videoconferencing have been installed on the hard disk 135. A communications board 136 is connected to the host computer system.

The general operation of the system constructed as set forth above will now be described.

First, power is introduced to the host personal computer 101 and the videoconferencing application is started up. When the start of videoconferencing is designated by the videoconference application, the CPU (not shown) of the host personal computer 101 sends a prescribed command to the microprocessor 130 of the expansion board 111 so as to turn on the power supply of the video camera unit 103. In response to an indication from the microprocessor 130 that has received the above-mentioned command in this system, the power supply circuit of the expansion board 111 supplies power to the video camera unit 103 via the integrated cable 104. (The power supply circuit and power line are not shown.)

The video camera unit 103 thus supplied with power is thenceforth initialized and performs an image sensing operation by processing the command from the microprocessor 130 of the expansion board 111 by the microprocessor 120 of the video camera unit 103 via the VIDS 128, integrated cable 104 and VIDS 119. The components of the video camera unit 103 are controlled by commands from the microprocessor 120. A command in response to various commands from the expansion board 111 is output by the microprocessor 120, superimposed by the adder 117 upon the vertical blanking interval of a CCD signal adjusted by the correlated double sampling circuit 115 and automatic gain control circuit 116 and sent to the expansion board 111 via the integrated cable 104. A signal indicating the vertical blanking interval is generated by the SSG 129 on the side of the expansion board and is received by the VIDS 119 on the side of the video camera unit 103.

The CCD signal resulting from imaging by the video camera unit 103 undergoes correlated double sampling and gain adjustment. The above-mentioned CCD signal is superimposed upon the command by the VIDS 119 in its vertical blanking interval and sent to the expansion board 111 via the integrated cable 104. The expansion board 111 receives the CCD signal and converts the signal to digital data using the A/D converter 123.

The image portion of the digital data resulting from the conversion is supplied to the camera process circuit 124, which serves as signal processing means, and the command portion from the video camera unit 103 is supplied to the microprocessor 130 via the VIDS 128.

The camera process circuit 124 applies prescribed color processing and white-balance adjustment to the image signal from the video camera unit 103 in digital fashion and outputs Y and U/V signals, which are digital video signals that have been adjusted to a proper level. The camera process circuit 124 extracts a sharpness signal necessary to drive the lens unit 112 and outputs the sharpness signal to the microprocessor 130. A signal for driving the lens unit 112 is output from the microprocessor 130 to the video camera unit 103 via the VIDS 128 and 119. The digital Y, U/V signals are supplied to the video process circuit 125, which serves as image processing means, for being subjected to image-data compression processing and the like for purposes of communication. Here the communication compression scheme used is that for compressing moving images in videoconferencing. The scheme is typified by H261 of ITU-T, by way of example.

Besides being subjected to the above-mentioned compression processing, the digital Y, U/V signals are supplied to the PCI bus controller 127 for transfer to the host computer system 134.

The input from the microphone 121 of the video camera unit 103 is amplified by the amplifier 122, after which the amplified signal is input to the adder 137 of the expansion board 111 via the integrated cable 104 The input from the microphone of the microphone set 107 is amplified by an amplifier 138 of the expansion board 111 and then input to the adder 137. The adder 137 adds the microphone input from the video camera unit 103 and the microphone input from the microphone set 107 and inputs the sum to the audio A/D converter 131. The microphone inputs that have been converted to digital data by the audio A/D converter 131 are subjected to prescribed voice-data compression processing by the audio process circuit 133. Here the voice-data compression scheme used is that for compressing voice in videoconferencing. The scheme is typified by G728 of ITU-T, by way of example.

The above-mentioned compressed voice data and compressed image data are multiplexed together with the control command from the microprocessor 130 by means of the multiplexer/demultiplexer 126. The multiplexing scheme is that typified by H221 of ITU-T. The multiplexed data is transmitted to the communications board of another party via the communications board 136 and an ISDN line by control executed by the CPU of the host computer system 134.

The compressed multiplexed data received from the ISDN line is demultiplexed into an image, voice and a control signal by the multiplexer/demultiplexer 126. The demultiplexed compressed image signal is transmitted to the video process circuit 125, decompressed and then transmitted from the PCI bus controller 127 to the host computer system 134 via the PCI bus. The demultiplexed compressed voice data is decompressed by the audio process circuit 133 and then transmitted to the host computer system 134 via the PCI bus controller 127 so that audio can be heard from a speaker (not shown) connected to the host computer system 134. The decompressed voice data is also directed through the audio D/A converter 132 so that it can be heard using a speaker (not shown) and the microphone set 107 connected to the expansion board 111.

In the system described above, the user starts up the application that has been installed in the host personal computer 101 and controls the video camera, whereby it is possible not only to display the user's own image locally on the monitor 102 of the host personal computer 101 but also to communicate video, audio and data via the ISDN line. Further, since the system is capable of data communication, it is possible to use the mouse 106 and keyboard 105 to control not only the local camera but also the camera on the side of the communicating party by virtue of the application software.

In the system according to the prior art set forth above, a board including the circuitry up to the camera process circuit is inserted into a slot of the host personal computer 101 and thus can be received within the main body of the host personal computer 101. This makes it possible to achieve a reduction in the size of the apparatus. However, a disadvantage is that a special integrated cable must be used. Furthermore, the user must perform an operation such as removing the cover from the main body of the host personal computer 101 in order to install the expansion board. This is a troublesome and time-consuming operation.

Accordingly, a user-friendly system for inputting images to the host personal computer 101 has been developed and utilizes a standard interface with which the host personal computer 101 is equipped. In particular, one product (DVC 300, manufactured by Eastman Kodak, Co.) that is available inputs an image to the host personal computer 101 using a USB (Universal Serial Bus), which is an interface adopted in the specifications of PC 97 disclosed in the "PC 97 Hardware Design Guide" of Microsoft Corporation, and makes it possible to view an image on the monitor of the host personal computer 101 merely by using a driver application without relying upon a special-purpose board.

However, the two systems described above merely transmit a digital video signal (moving images) to the host personal computer 101 via an interface cable. In a case where a still image is to be displayed, the image in a display memory within the host personal computer 101 is merely frozen on the monitor screen. In other words, with the systems described above, the image input to the host personal computer 101 is only a digital video signal (a moving image). Even if an event such as loss of an image due to a data error should occur, therefore, the effect upon the moving image is small because the image is refreshed in successive fashion. Accordingly, a drawback is that these systems do not take into account the handling of digital still images when they are transferred to the host personal computer 101.

SUMMARY OF THE INVENTION

Accordingly, an object of the present invention is to provide an image input apparatus and system and an image sending/receiving system in which settings can be made with ease and whereby low-resolution images such as digital moving images and high-resolution images such as still images can be transmitted to a host personal computer and videoconferencing can be carried out in cooperation with an application.

Another object of the present invention is to provide a system in which a changeover between the sensing and transfer of low-resolution images such as moving images and high-resolution images such as still images can be performed smoothly during image sensing and data transfer operations.

A further object of the present invention is to provide a system in which data handling that takes into account the real-time nature of videoconferencing can be performed in regard to image sensing and transfer.

In accordance with the present invention, the foregoing objects are attained by providing an image input apparatus which, in a first aspect thereof, comprises: image signal generating means for sensing the image of a subject and generating an image signal indicative thereof; data transfer means for transferring the image signal generated by the image signal generating means to an external device via a prescribed communications interface, the data transfer means having a first transfer mode in which there can be assured a fixed transfer rate but with no guarantee of data, and a second transfer mode in which data is guaranteed but transfer rate is not; and control means for controlling the data transfer means so as to perform image transfer in the first transfer mode in a case where the image signal generating means generates a low-resolution image signal and in the second transfer mode in a case where the image signal generating means generates a high-resolution image signal.

In accordance with the present invention, the foregoing objects are attained by providing an image input apparatus which, in a second aspect thereof, comprises: image signal generating means for sensing the image of a subject and generating an image signal indicative thereof; data transfer means for transferring the image signal generated by the image signal generating means to an external device via a prescribed communications interface, the data transfer means having a first transfer mode in which there can be assured a fixed transfer rate but with no guarantee of data, and a second transfer mode in which data is guaranteed but transfer rate is not; control means for controlling the data transfer means so as to perform image transfer in the first transfer mode in a case where the image signal generating means generates a low-resolution image signal and in the second transfer mode in a case where the image signal generating means generates a high-resolution image signal; and sensing means for sensing a high-resolution image input instruction from an operator; wherein in a case where the sensing means senses the high-resolution image input instruction generated during low-resolution image data transfer by the data transfer means in the first transfer mode, the control means performs control so as to cause the image signal generating means to generate a high-resolution image and performs control so as to change over the transfer mode.

Further, an image input system according to the present invention comprises the image input apparatus described in claim 5 and input means disposed externally of the image input apparatus for inputting the high-resolution image input instruction to the image input apparatus.

Further, the present invention provides an image sending/receiving system having an image input apparatus capable of sensing at least a low-resolution image and a high-resolution image, and a host computer having communication means for communicating data, which includes at least image data, between the host computer and a remote apparatus through a communication line, the image input apparatus including: image signal generating means for sensing the image of a subject and generating an image signal indicative thereof; data transfer means for transferring the image signal generated by the image signal generating means to an external device via a prescribed communications interface, the data transfer means having a first transfer mode in which there can be assured a fixed transfer rate but with no guarantee of data, and a second transfer mode in which data is guaranteed but transfer rate is not; control means for controlling the data transfer means so as to perform image transfer in the first transfer mode in a case where the image signal generating means generates a low-resolution image signal and in the second transfer mode in a case where the image signal generating means generates a high-resolution image signal; sensing means for sensing a high-resolution image input instruction from an operator; and discrimination means for discriminating whether the host computer is communicating with the remote apparatus; wherein in a case where the sensing means senses the high-resolution image input instruction generated during low-resolution image data transfer by the data transfer means in the first transfer mode, the control means performs control so as to cause the image signal generating means to generate a high-resolution image and performs control so as to change over the transfer mode.

Further, in accordance with the present invention, there is provided an image input method for inputting an image and transferring the image to an external device, which method, in a first aspect thereof, comprises: an image signal generating step of sensing the image of a subject and generating an image signal indicative thereof; and an image transfer step of transferring the image signal generated at the image signal generating step to the external device via a prescribed communications interface, wherein the image transfer step performs image transfer in a first transfer mode, in which there can be assured a fixed transfer rate but with no guarantee of data, in a case where a low-resolution image signal is generated at the image signal generating step, and in a second transfer mode, in which data is guaranteed but transfer rate is not, in a case where a high-resolution image signal is generated at the image signal generating step.

Further, in accordance with the present invention, there is provided an image input method for inputting an image and transferring the image to an external device, which method, in a second aspect thereof, comprises: an image signal generating step of sensing the image of a subject and generating an image signal indicative thereof; an image transfer step of transferring the image signal generated at the image signal generating step to the external device via a prescribed communications interface, wherein the image transfer step performs image transfer in a first transfer mode, in which there can be assured a fixed transfer rate but with no guarantee of data, in a case where a low-resolution image signal is generated at the image signal generating step, and in a second transfer mode, in which data is guaranteed but transfer rate is not, in a case where a high-resolution image signal is generated at the image signal generating step; and a changeover step of generating a high-resolution image signal and changing over the transfer mode to the second transfer mode in a case where the operator issues a high-resolution image input instruction during low-resolution image data transfer in the first transfer mode.

Further, in accordance with the present invention, there is provided a storage medium storing a control program for inputting an image and transferring the image to an external device, which control program, in a first aspect of the storage medium, comprises: code of an image signal generating step of sensing the image of a subject and generating an image signal indicative thereof; and code of an image transfer step of transferring the image signal generated at the image signal generating step to the external device via a prescribed communications interface, wherein the image transfer step performs image transfer in a first transfer mode, in which there can be assured a fixed transfer rate but with no guarantee of data, in a case where a low-resolution image signal is generated at the image signal generating step, and in a second transfer mode, in which data is guaranteed but transfer rate is not, in a case where a high-resolution image signal is generated at the image signal generating step.

Further, in accordance with the present invention, there is provided a storage medium storing a control program for inputting an image and transferring the image to an external device, which control program, in a second aspect of the storage medium, comprises: code of an image signal generating step of sensing the image of a subject and generating an image signal indicative thereof; code of an image transfer step of transferring the image signal generated at the image signal generating step to the external device via a prescribed communications interface, wherein the image transfer step performs image transfer in a first transfer mode, in which there can be assured a fixed transfer rate but with no guarantee of data, in a case where a low-resolution image signal is generated at the image signal generating step, and in a second transfer mode, in which data is guaranteed but transfer rate is not, in a case where a high-resolution image signal is generated at the image signal generating step; and code of a changeover step of generating a high-resolution image signal and changing over the transfer mode to the second transfer mode in a case where the operator issues a high-resolution image input instruction during low-resolution image data transfer in the first transfer mode.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 6 is a diagram useful in describing displacement of an optical path by parallel plates;

FIG. 7 is a diagram showing the timing at which a parallel plate is driven;

FIG. 8 is a diagram showing directions in which pixels are shifted;

FIG. 9 is a diagram showing a Bayer-type filter array;

DESCRIPTION OF THE PREFERRED EMBODIMENTS

Preferred embodiments of the present invention will now be described in detail with reference to the accompanying drawings.

First Embodiment

Figure 1:
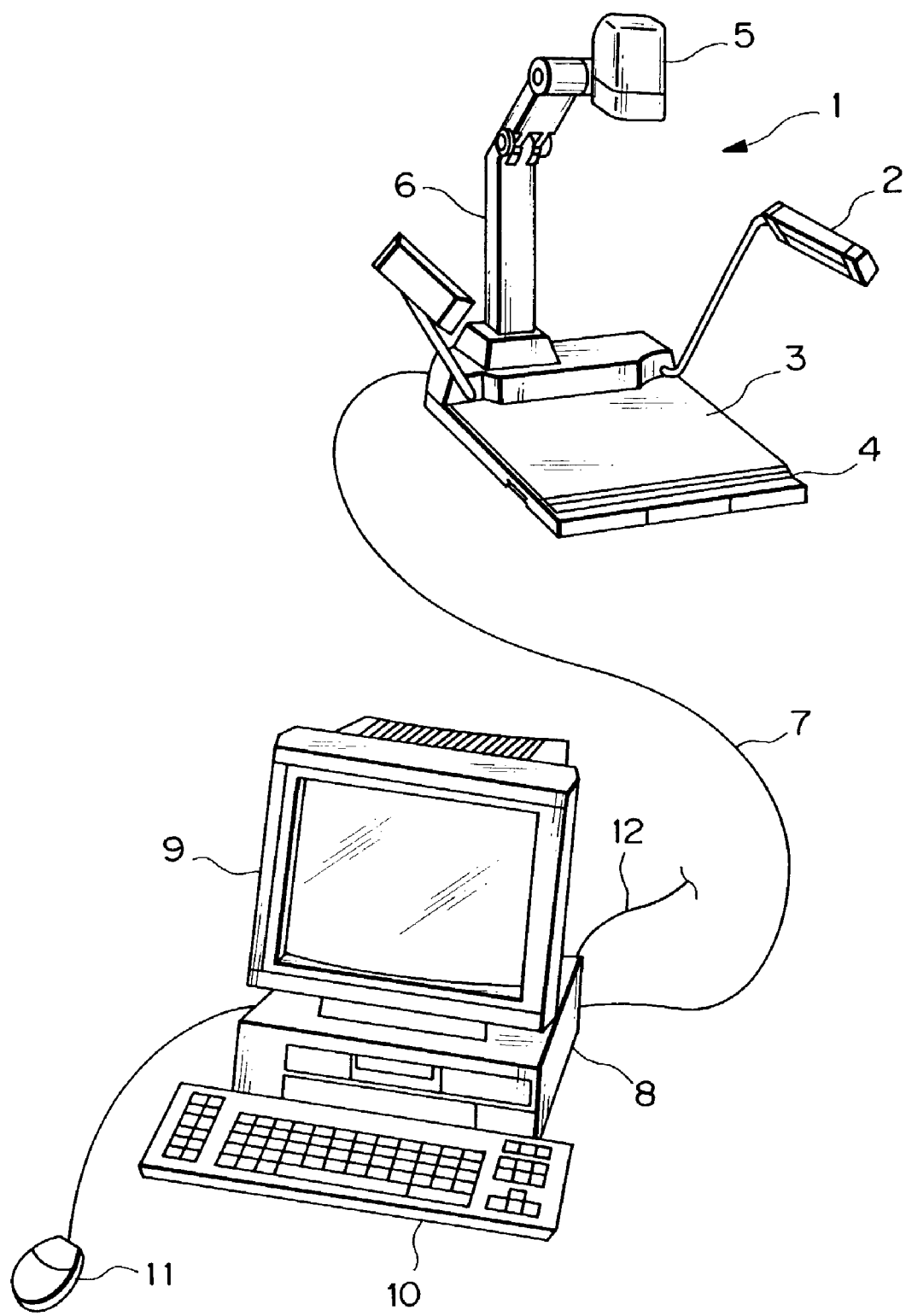
FIG. 1 is an external view showing an image input apparatus and system and an image sending/receiving system according to an embodiment of the present invention.

FIG. 1 is an external view showing the overall configuration of a desktop videoconference system according to a first embodiment of the present invention.

As shown in FIG. 1, the system includes a visualizer 1, which has an illuminating light 2, a document glass 3, a control panel 4 for operating the visualizer 1, an image data generating unit such as a freely rotatable camera head 5, and a camera head support 6 having a freely rotatable joint. The visualizer 1 makes it possible to switch between and output a moving image and a still image in response to instructions from the control panel 4 or host personal computer, as will be described later.

A USB cable 7 connects the visualizer 1 to a host personal computer 8, which has a monitor 9 serving as a display unit, a keyboard 10 and a mouse 11. A cable 12 is connected to an ISDN line, which is connected to a communications board 37 (see FIG. 2).

Figure 2:
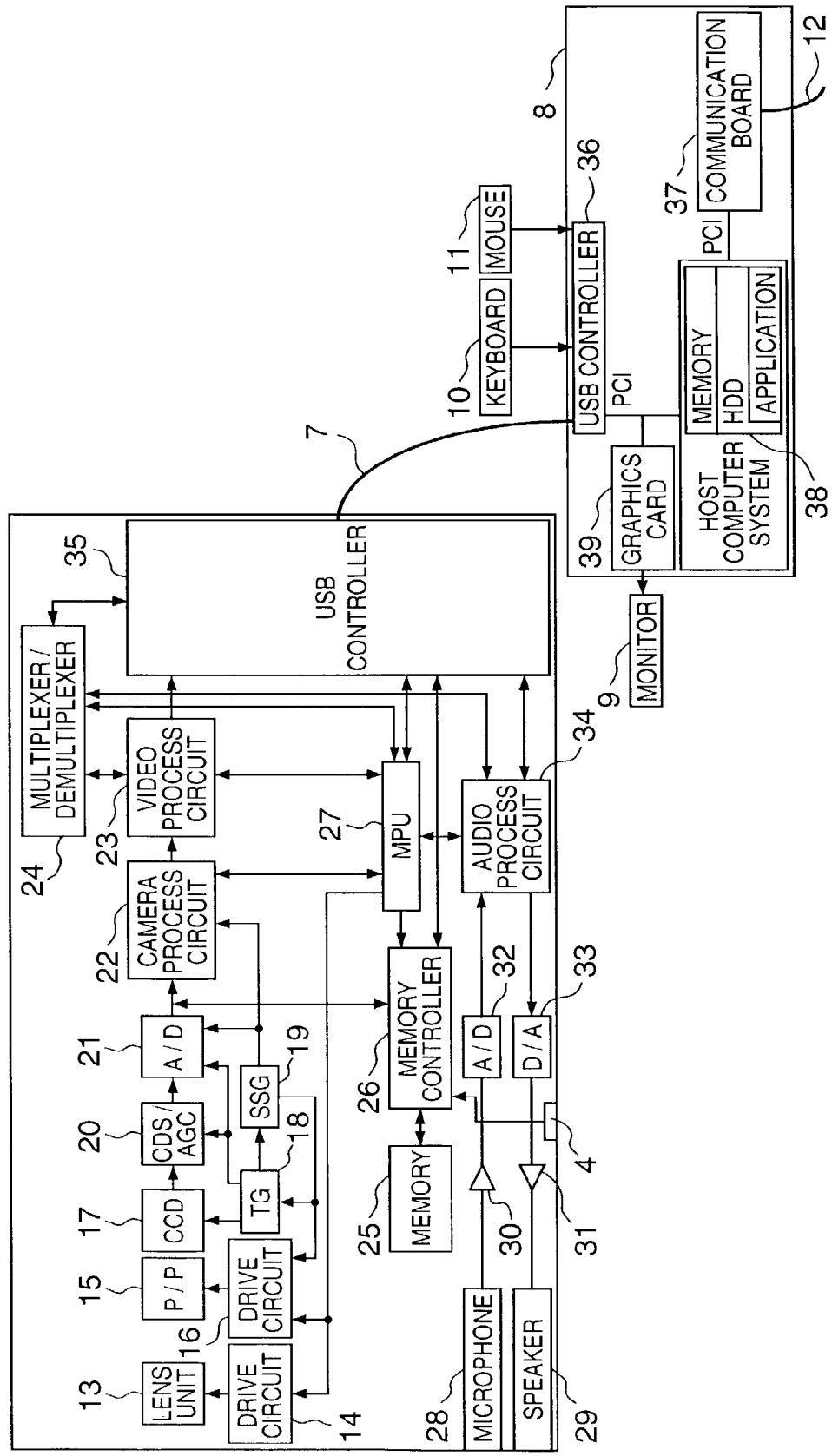
FIG. 2 is a block diagram showing the flow of signals in FIG. 1.

FIG. 2 is an overall block diagram showing the flow of various signals in the system of FIG. 1.

As shown in FIG. 2, the visualizer 1 includes a lens unit 13 for focusing, a lens-unit drive circuit 14, a parallel plate (P/P in FIG. 2) 15 for shifting pixels by displacing the optic axis of an image in order to sense a high-resolution still image, and a parallel-plate drive circuit 16.

The image generator unit of the visualizer 1 further includes an image sensing device 17 such that as a CCD sensor, MOS sensor or image pick-up tube, a timing generator (TG in FIG. 2) 18, a synchronizing signal generator (SSG) 19, a combined correlated double sampling circuit and automatic gain control circuit 20, an A/D converter 21, a camera process circuit 22, a video process circuit 23, a multiplexer/demultiplexer 24 for multiplexing and demultiplexing data, audio and images, a memory 25 for capturing a still image and synthesizing a high-resolution still image and a memory controller 26 for performing memory address management in order to synthesize the high-resolution still image. The camera process circuit 22 and video process circuit 23 execute processing similar to that of the prior art described above and need not be described again.

The visualizer 1 further includes a microprocessor for controlling the overall visualizer 1, a microphone 28, a speaker 29, amplifiers 30, 31, an A/D converter 32, a D/A converter 33, an audio process circuit 34 and a USB controller 35. It should be noted that the present invention is applicable not only to a USB but also to a scenario in which an IEEE 1394 bus is used.

The USB-compatible 8 is capable of communicating with an external device via USB system software (not shown) and a USB controller 36. Devices such as the keyboard 10 and mouse 11 also send data to and receive data from the system bus (PCI bus) of the host personal computer 8 via the USB controller. A communications board 37 is connected to the host computer system, which is composed of a CPU, chip set and memory, by the PCI bus. The communications board 37 is controlled by the CPU (not shown) of the host personal computer 8.

An application for videoconferencing and image input has already been installed on a hard disk (HDD in FIG. 2) 38 connected to the PCI bus via an IDE interface (not shown). Further, a graphics card 39 having a display memory is connected to the PCI bus and causes a display to be presented on the monitor display 9.

The USB (Universal System Bus) will now be described in simple terms. The USB is characterized in that it supports plug-and-play and makes it possible to add or delete peripherals while the personal computer is running, a maximum of 127 peripherals such as a display, keyboard and mouse being connectable.

Figure 3:
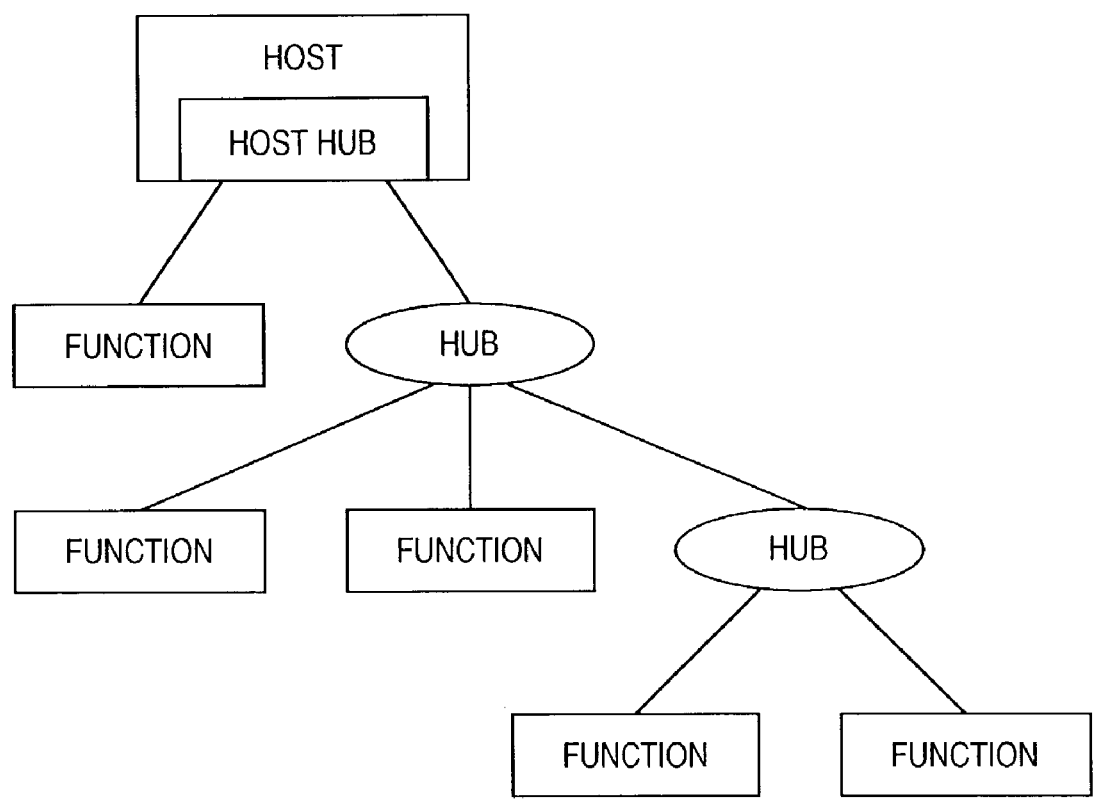
FIG. 3 is a diagram showing the topology of a USB.

With a USB, basically there is one host and a data transfer without the intermediary of the host is not possible. The topology is of the multistar type, in which a host having a route root hub branches via hubs, as shown in FIG. 3. Functions (devices) of a maximum of six layers can be connected. Owing to such factors as data delay, the distance from the host to the fastest function (device) is limited to 30 m.

As for transfer speed, the USB is available in a 12-Mbps full-speed mode and a 1.5-Mbps low-speed mode, and different specifications are available for different AC electrical characteristics as well. Transfer is performed in a half-duplex transfer mode.

Data transfer is performed by time sharing using frames, and a packet serving as an SOF (Start of Frame) is attached to the beginning of each frame.

There are four USB transfer formats, namely isochronous transfer, interrupt transfer, bulk transfer (asynchronous transfer) and control transfer.

Isochronous transfer is a transfer scheme having the highest priority and bandwidth is assured. However, there is no assurance in regard to data error.

Interrupt transfer has assured transmission delay time and therefore is suited to transfer of input information from a keyboard or mouse.

Bulk (isochronous) transfer is suited to transfer of a large quantity of data at irregular intervals but transfer speed is not assured.

Figure 4:
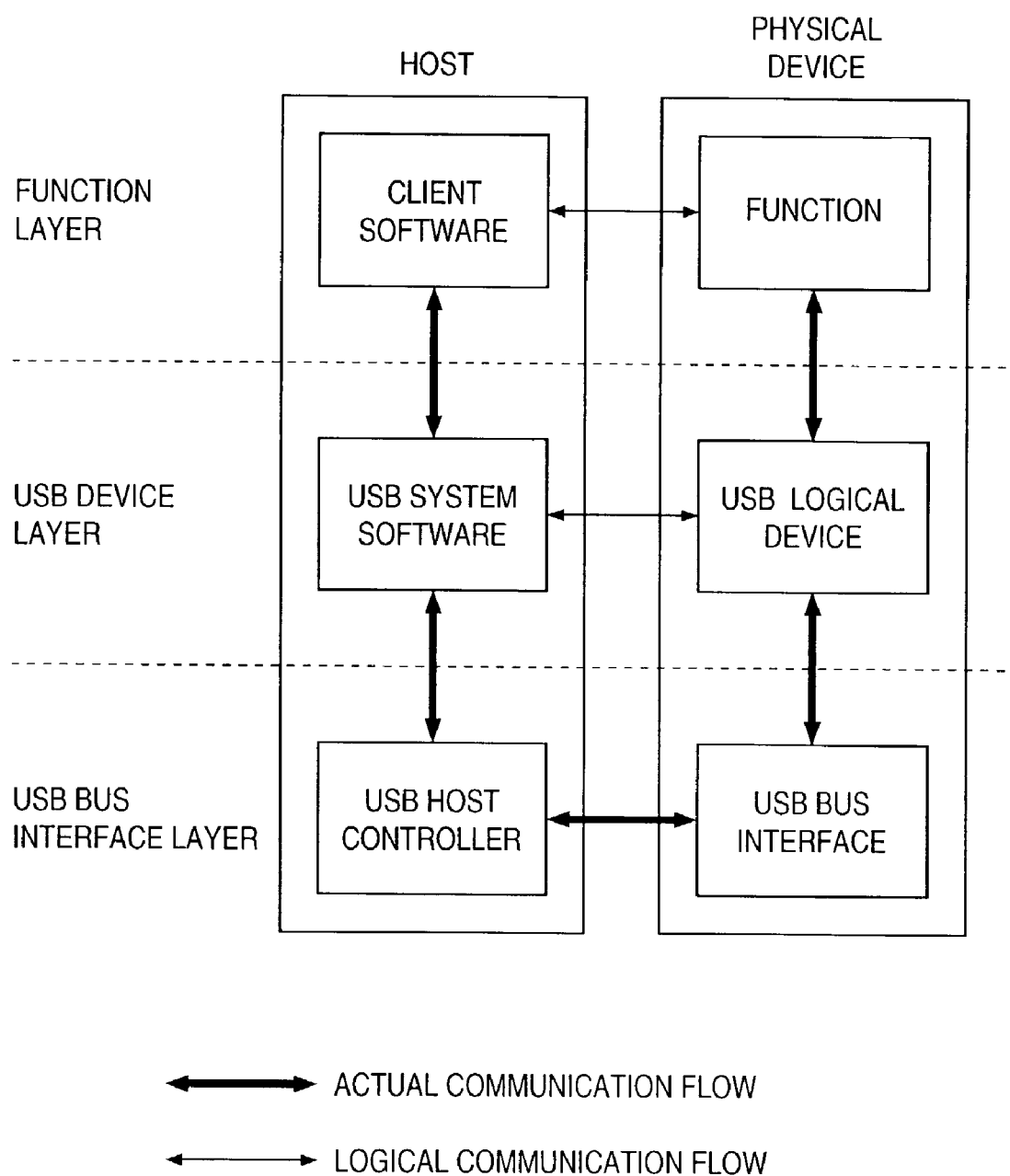
FIG. 4 is a diagram showing the data flow of a USB.

Control transfer is used for configuration of a USB device and to send and receive messages. When a device is connected to the USB, the device is configured to the host, the end point is set and the pipe is assured to make possible the transfer of data. All data transfer is performed by the initiative of the host. In the example and structure shown in FIG. 4, the USB device layer and the function layer perform logical communication, whereby communication between the host and the function of a physical device can be carried out. In the function layer, a plurality of logical pipes are handled, whereby data communication becomes possible between the host and function.

The general operation of the desktop videoconference system will now be described.

Described first will be operation from image sensing to transfer to the host personal computer 8 in a moving-image mode in a case where the moving-image mode has been selected by the control panel 4, keyboard 10 or mouse 11. The image sensed by the lens unit 13 is formed on the CCD 17 via the parallel plate 15. In the case of the moving-image mode, the parallel plate 15 is not driven by the parallel-plate drive circuit 16. The CCD 17 converts the optical image to an electric signal and outputs the same in conformity with the timings of the timing generator 18 and synchronizing signal generator 19. The output CCD signal is adjusted by the combined correlated double sampling circuit and automatic gain control circuit 20. The CCD signal thus adjusted is supplied to the A/D converter 21, where it is converted to a digital image signal. The digital image signal is subjected to prescribed color processing and white-balance adjustment by the camera process circuit 22 in digital fashion and is then output as Y and U/V signals, which are digital video signals that have been adjusted to the proper level. The camera process circuit 22 extracts an AE signal and sharpness signal necessary to drive the lens unit 13 and outputs these signals to the microprocessor 27. The latter drives the lens-unit drive circuit 14 to perform focusing by adjusting the aperture and driving the lens by hill-climbing control.

The digital video signal output by the camera process circuit 22 is applied to the video process circuit 23 to be subjected to image-data compression processing and the like for purpose of communication. Here the communication compression scheme used is that for compressing moving images in videoconferencing. The scheme is typified by H261 of ITU-T, by way of example.

Besides being subjected to the above-mentioned compression processing, it is also possible to apply the digital video signal to the USB controller 35 for transfer in the format of Y, U/V to the host computer system 8. The compressed data or the digital video signal in the Y, U/V format is supplied to the graphics card 39 via the USB controller 36 on the side of the host personal computer 8 through the USB cable 7, whereby an image is displayed on the monitor. Transfer of moving images using this USB will be described in detail later.

Described next will be operation from image sensing to transfer to the host personal computer 8 in a high-resolution still-image mode in a case where the high-resolution still-image mode has been selected by the control panel 4, keyboard 10 or mouse 11. The image sensed by the lens unit 13 is formed on the CCD 17 via the parallel plates 15. The parallel plates 15 are driven in synchronism with a vertical synchronizing signal (V SYNC) from the synchronizing signal generator 19. The CCD 17 converts the optical image to an electric signal and outputs the same in conformity with the timings of the timing generator 18 and synchronizing signal generator 19. The output CCD signal is converted to a digital signal by the A/D converter 21.

The method of driving the parallel plates in the high-resolution still-image mode and the control of memory will now be described.

Figure 5:
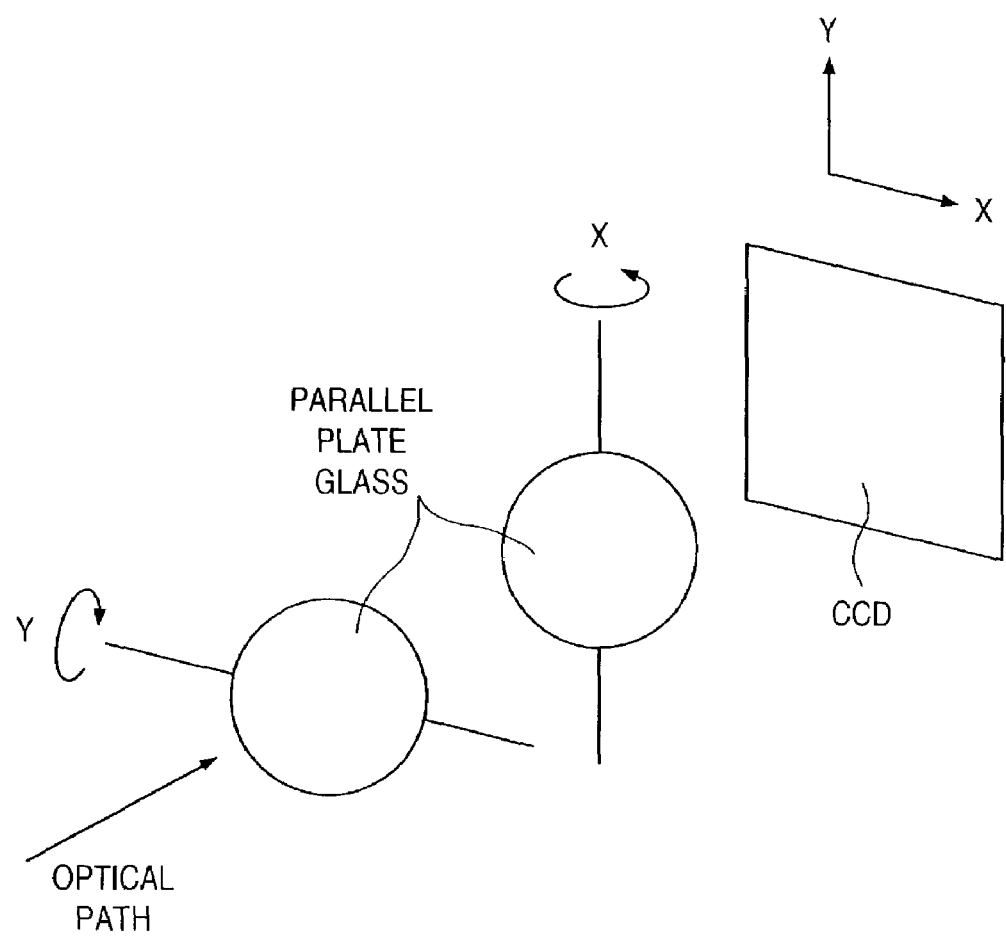
FIG. 5 is a diagram showing the operation of parallel plates.

In the high-resolution still-image mode, the microprocessor 27 sends a control signal to the parallel-plate drive circuit 16 to drive the parallel plate 15. The parallel plate 15 is arranged as shown in FIG. 5, by way of example. Specifically, two parallel plates of glass are so arranged as to turn about respective horizontal and vertical axes of rotation. Controlling the angle of rotation makes it possible to displace the optical path. The optical path is displaced by refraction when light impinges upon the parallel plate at a fixed angle of incidence. The amount of displacement is a function of the thickness of the glass and the angle of incidence (angle of rotation).

On the basis of a control signal from the microprocessor 27, the parallel-plate drive circuit 16 generates a driving waveform of the kind shown in FIG. 7. Specifically, the parallel-plate drive circuit 16 generates control waveforms that shift pixels in the X (horizontal) direction and Y (vertical) direction every frame [where one frame comprises two vertical synchronizing signals (V)] in synchronism with the vertical synchronizing signal (V) from the synchronizing signal generator 19.

On the basis of the control waveforms, the parallel-plate drive circuit 16, for example, is driven to actually shift the optical path by a prescribed amount. In this embodiment, it is assumed that the amount by which the optical path is shifted is the width of one pixel of the CCD 17 and that the optical path is shifted by one pixel in each of the horizontal or vertical direction (①→②), as shown in FIG. 8, in accordance with the driving waveforms of FIG. 7. This shall be referred to as a "one-pixel shift". As a result of the one-pixel shift, the CCD 17 is capable of generating still-image video data corresponding to the three colors R, G, B in a period of four frames. Movement of the pixel position at this time is ①→②→①→③→④ or ①→②→③→④ in FIG. 8. In regard to each pixel position, it is possible to pick up data of the other two colors lost in ordinary image sensing.

Figure 10:
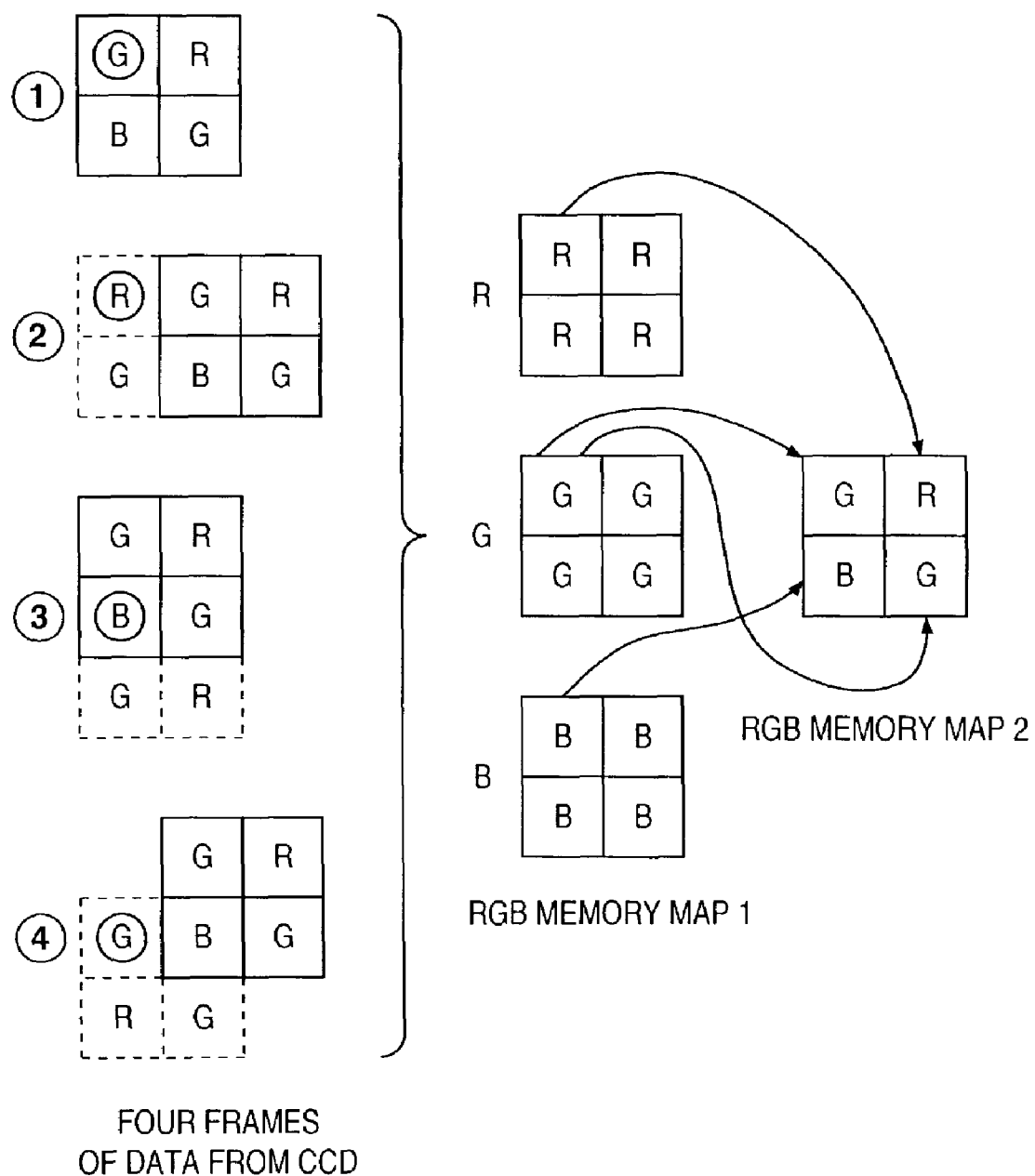
FIG. 10 is a diagram showing synthesis of an image by shifting pixels.

The four-frame still-image CCD data arrives frame by frame at the A/D converter 21 through a path similar to that traversed in the moving-image mode and is converted to a digital signal in the manner described above. The digitally converted still-image CCD data is sent to the memory controller 26. On the basis of a color array of the kind shown in FIG. 9, the memory controller 26 rearranges the video data, which is obtained in the order illustrated on the left side of FIG. 10, in the memory 25 in the manner shown at the center of FIG. 10. Further, by memory-mapping the color data of the encircled pixel positions on the left side of FIG. 10 in the manner shown on the right side, an image having four times the size of an image sensed by the ordinary Bayer method is produced. (Image quality is increased by a factor of three.)

The high-resolution still-image video data thus rearranged and stored in the memory 25 is read out ¼ image at a time via the memory controller 26 at a predetermined timing. The data is transmitted to the host personal computer 8 via the camera process circuit 22, video process circuit 23 and USB controller 35.

Control operation in the image sensing mode and USB transfer mode, which are the principal characterizing features of this embodiment, will now be described in detail.

Figure 11:
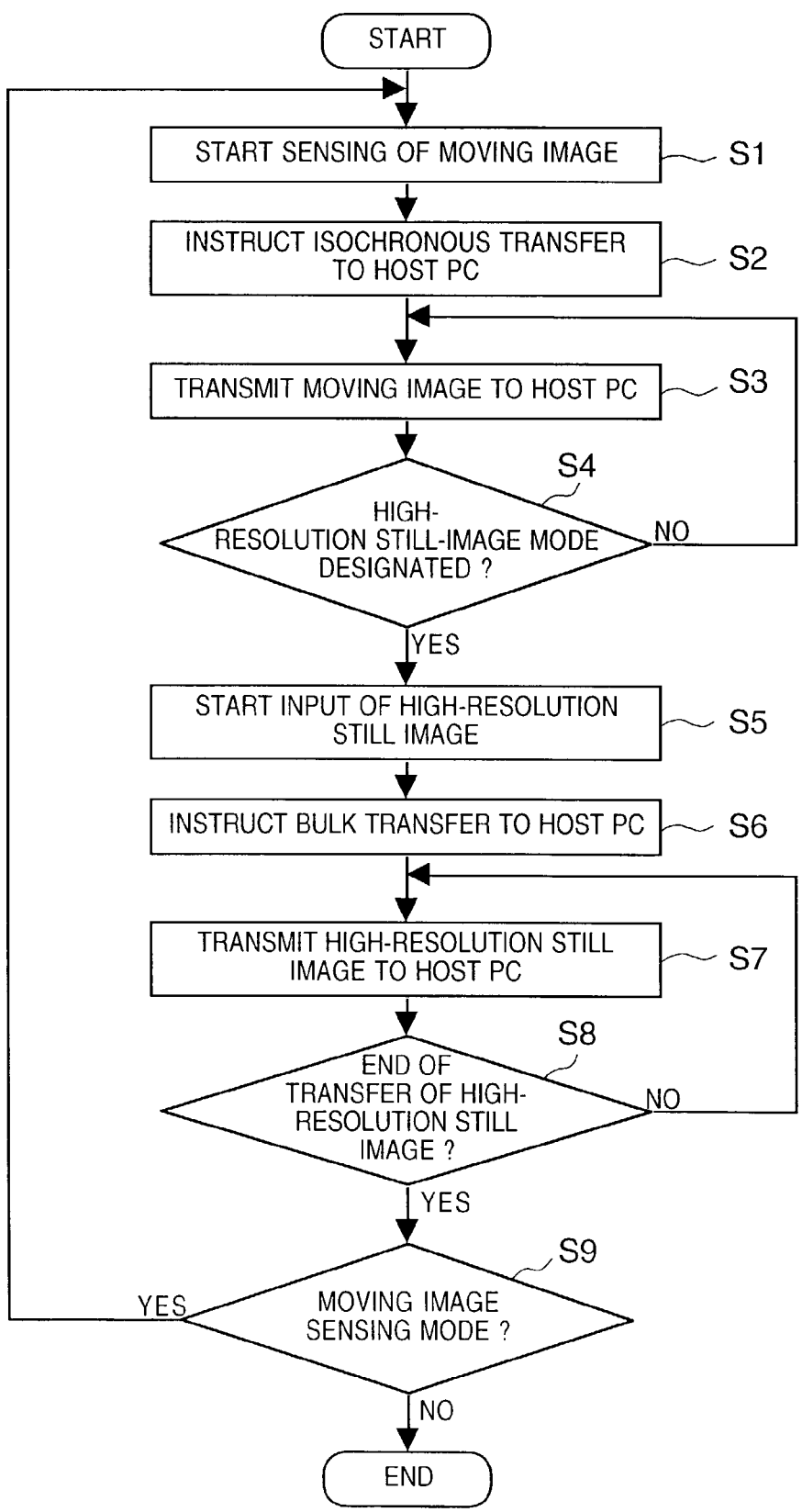
FIG. 11 is a flowchart for describing changeover between an image sensing mode and a transfer mode.

Transfer relating to local image sensing will be described first. FIG. 11 is a flowchart illustrating operation of this system. The steps of the flowchart will be described.

First, at step S1, the application in the hard disk drive 38 issues an image sensing instruction in response to an indication from the control panel 4 of the visualizer 1 or from the keyboard 10 or mouse 11 of the host personal computer 8. As a result, the visualizer 1 starts the sensing of moving images in the moving-image mode described earlier.

Next, at step S2, the microprocessor 27 instructs isochronous transfer for moving-image transfer to the host personal computer 8 in order for the image to be transferred to the host personal computer 8. (In a case where the image sensing instruction has been issued by an application in the host personal computer 8, however, control is performed from the application within the host personal computer 8.) That is, at the time of configuration, the CPU of the host personal computer 8 controls the USB controller, produces the end point of the isochronous transfer and allocates bandwidth.

This is followed by step S3, at which the microprocessor 27 of the visualizer 1 performs control in such a manner that the digital Y, U/V signals representing the digital moving image are transmitted to the host personal computer 8 in frame units.

It is sensed at step S4 whether a high-resolution still-image input instruction has been issued by the operator from the control panel of the visualizer 1 or from the application of the host personal computer 8. In a case where the high-resolution still-image mode described above has not been selected in this system, the visualizer 1 continues to transfer moving images to the host personal computer 8.

In a case where the high-resolution still-image mode described above has been selected in this system, the visualizer 1 starts inputting the high-resolution still image at step S5. This means that the high-resolution still-image data in the high-resolution still-image mode is stored in the memory 25 and that memory mapping is performed by the memory controller 26. At almost the same time that the high-resolution still image is input at step S5, the microprocessor 27 controls the USB controller 35 on the side of the visualizer 1 at step S6 to send, by interrupt transfer or the like, the host personal computer 8 a request to perform bulk transfer. In response, a pipe for bulk transfer is acquired and the transfer of data is made possible.

The visualizer 1 transmits the high-resolution still image created at step S5 to the host personal computer 8 at step S7.

Next, at step S8, it is determined whether the transfer of the high-resolution still image has ended. If the host personal computer 8 senses that the transfer has ended, the host personal computer 8 decides at step S9 whether the system should continue image sensing in the moving-image mode. If the decision is "YES", control returns to step S1. If the decision is "NO", then operation of the system is halted.

In the embodiment described above, the signal processor of the CCD 17 is integrated with the camera proper and an easy-to-use USB interface is employed. This makes it possible to eliminate the troublesome task of installing an expansion board as by removing the cover of the host personal computer 8, which is required in the prior art.

Further, it is so arranged that moving and still images can be handled in the optimum transfer mode in terms of a USB or IEEE 1394 interface. As a result, in an image sensing apparatus capable of sensing moving and still images, it is possible to avoid loss of data that occurs in a case where a still image is transferred during transfer of a moving image in a transfer mode that does not guarantee data, thereby making it unnecessary to enter the still image again. Such reentry of the still image data is time consuming because it involves sensing, storing and memory mapping of a plurality of frames. Even if an arrangement is adopted in which a high-resolution still image is saved in the memory 25 and the image is re-transmitted at the occurrence of an error, the re-transmission of the entire image takes time and the performance of the memory 25 declines. When such an arrangement is compared with a case where the method of this embodiment is used, it is found that the present invention provides much higher system performance.

Second Embodiment

In the first embodiment, what is primarily described is transfer of a local image to the host personal computer 8 and display of the image on the monitor of the host personal computer 8 in order for an operation to performed using an application or the like.

In this embodiment, transfer of data from the visualizer 1 to the host personal computer 8 during a videoconference will be described.

The system configuration is the same as that of the system described in conjunction with FIGS. 1 and 2. During a videoconference, however, the image data processed by the camera process circuit 22 is subjected to compressing coding such as in accordance with H261 by the video process circuit 23 and the compressed coded data is transmitted to the multiplexer/demultiplexer 24. Data obtained by audio compression such as in accordance with G723 of ITU-T performed by the audio process circuit 34 and control data from the microprocessor are multiplexed and transferred to the host personal computer 8 via the USB controller 35. At this time the multiplexed data is demultiplexed and the compressed image data is decompressed and displayed on the monitor 9 of the host personal computer 8 by the application installed in advance. Now the demultiplexed audio data is discarded for the sake of processing speed and audio quality (i.e., in order to eliminate the echo effects). The control command is interpreted by the CPU of the host personal computer 8 and used by the application. Meanwhile, the same multiplexed data is sent to the communications board 37 via the PCI bus by control performed by the microprocessor of the host personal computer 8, and the data is then transmitted to the terminal of the communicating party through the ISDN line.

USB control of the system at this time will now be described using the flowchart shown in FIG. 12.

Figure 12:
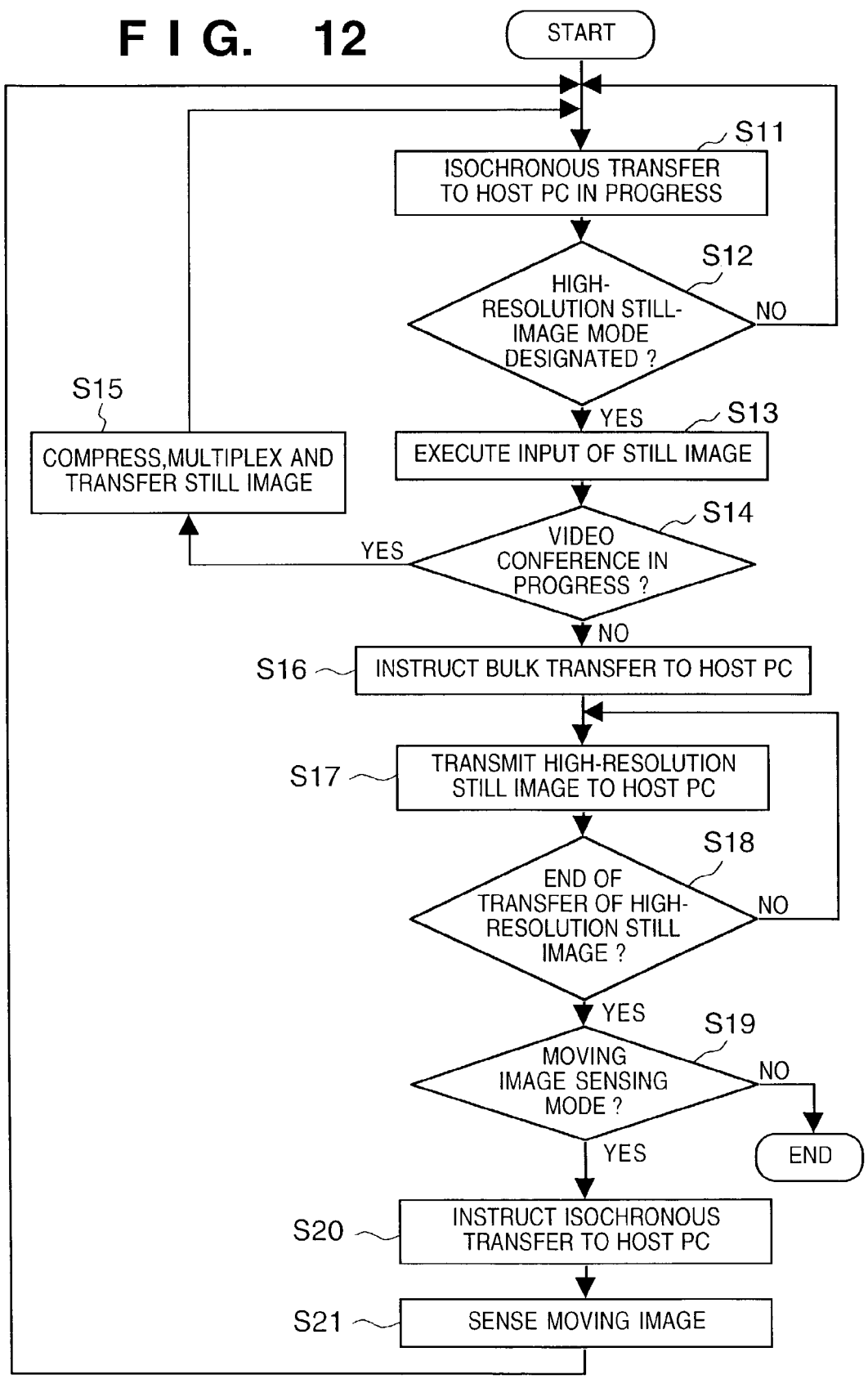
FIG. 12 is a flowchart for describing changeover between an image sensing mode and a transfer mode during videoconferencing in a second embodiment of the present invention.
Figure 13:
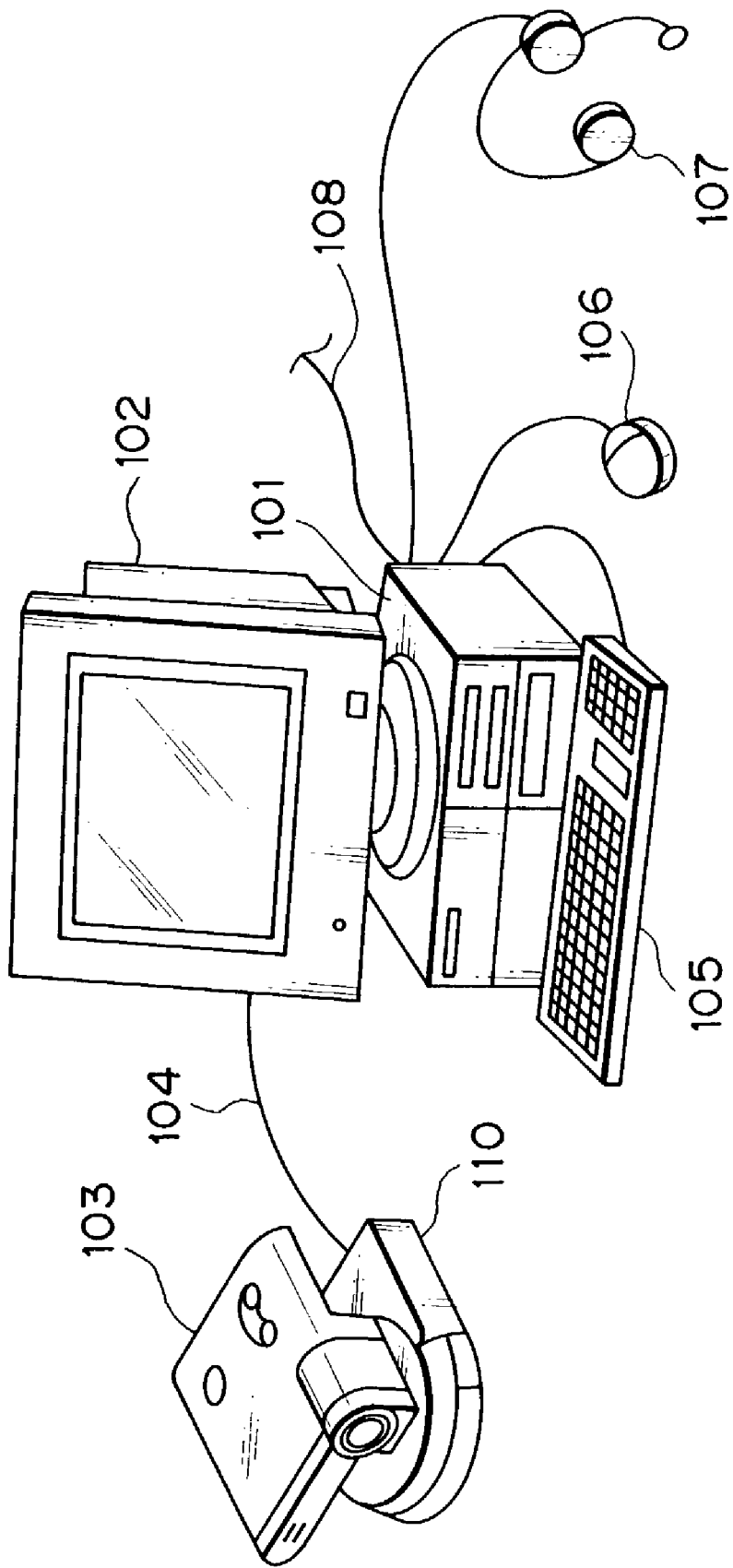
FIG. 13 is a diagram showing a system according to the prior art.
Figure 14:
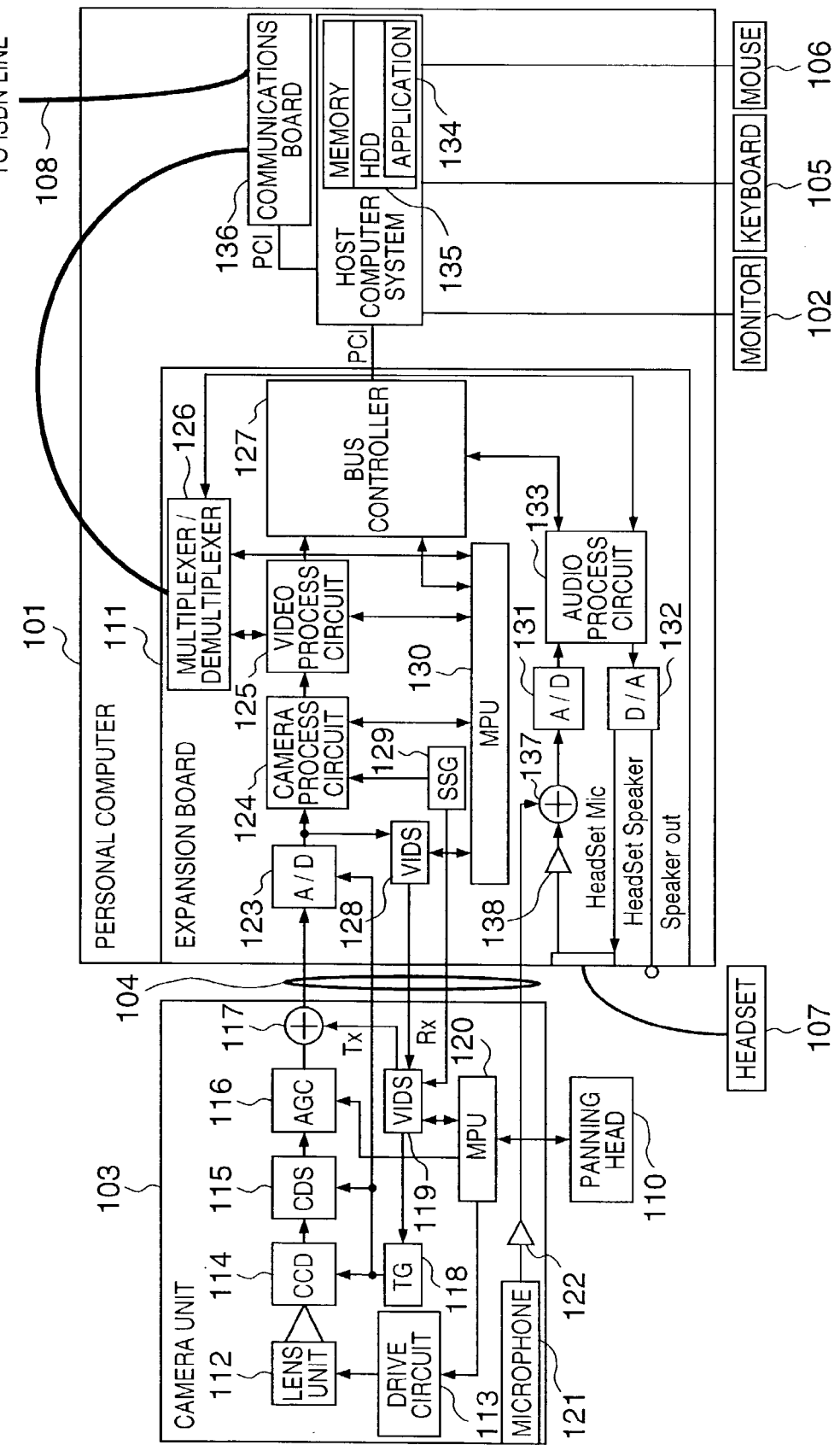
FIG. 14 is a diagram useful in describing the flow of signals in the system according to the prior art.

At step S11 in FIG. 12, the system transmits moving-image data from the visualizer 1 to the host personal computer 8 by isochronous transfer during moving-image transfer or videoconferencing.

Next, if a high-resolution still image is sensed at step S12, input of the high-resolution still image is executed at step S13.

This is followed by step S14, at which it is determined whether a videoconference is in progress. This information is a control command or the like from the host personal computer 8 and can be obtained by the visualizer 1 in advance.

If it is sensed at step S14 that a videoconference is in progress, the USB transfer mode is not changed over. Next, at step S15, the visualizer 1 transmits the still-image data captured at step S13 to the host personal computer 8 by isochronous transfer upon being compressed and multiplexed with other data via the camera process circuit 22, video process circuit 23 and multiplexer/demultiplexer 24.

If it is determined at step S14 that a videoconference is not in progress, a pipe is acquired by instructing the host personal computer 8 to make a changeover to the bulk transfer mode at step S16 in a manner similar to that of the first embodiment. Transmission is then performed. The processing of steps S17 to S21 is as described above in connection with the first embodiment.

Though the visualizer 1 is provided with the multiplexer/demultiplexer 24 in the foregoing embodiments, it is possible to execute the same processing by the application in the host personal computer 8. In such case various data would be transferred to the host personal computer 8 after being subjected only to compression.

In accordance with the second embodiment, as described above, it is so arranged that bulk transfer is not used during a videoconference, thereby making it possible to prevent the loss of image data transferred to the communicating party.

In the foregoing embodiments, isochronous transfer is performed when moving image data is transferred and bulk transfer (or asynchronous transfer) is carried out when a still image is transferred. However, this does not impose a limitation upon the present invention. What is essential is that the invention include use of isochronous transfer when a low-resolution image for preview purposes is transferred and bulk transfer (or asynchronous transfer) when a high-resolution image is transferred.

In other words, in a case where a low-resolution image for preview (which image is not limited to a moving image but may be low-resolution still image) is transferred, isochronous transfer is employed. Though the image is coarse, it can be previewed reliably in a short time. Even if a high-resolution image (which is not limited to a still image but may be a high-resolution moving image, e.g., a low frame-rate moving image formed by shifting pixels) flickers, a high-quality image can be transferred reliably.

It goes without saying that the present invention is not limited to isochronous transfer and bulk transfer (asynchronous transfer) using a USB but is applicable also to isochronous transfer and bulk transfer (asynchronous transfer) using an IEEE 1394 bus.

Further, it goes without saying that the present invention is applicable also to a digital camcorder, a digital still camera and a camera for videoconferencing.

The present invention further covers a scanner in which a coarse pre-scanned still image for preview is transferred isochronously and a high-resolution still image for actual use is sent to a host computer by bulk (or asynchronous) transfer.

In the foregoing embodiments, pixels are shifted when a high-resolution image is formed or transferred. It goes without saying that the shifting of pixels is not limited to shift by an amount equivalent to one pixel pitch as in the foregoing embodiments; a high-resolution image may be formed by a shift equivalent to half a pixel.

Further, though the optical image is displaced periodically as the method of shifting pixels, it goes without saying that the image sensing device may be displaced instead.

In a case where the number of pixels of the image sensing device is 1,000,000 or more for a high-resolution image and a low-resolution image is transferred, the image information may be reduced by downsampling or adding pixels.

Other Embodiments

It goes without saying that the objects of the present invention may be attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

Thus, in accordance with the present invention, as described above, it is possible to avoid loss of data that occurs in a case where a high-resolution image is transferred during transfer of a low-resolution image in a periodic transfer mode that does not guarantee data, and it is unnecessary to enter the high-resolution image again. Such re-entry of the high-resolution image is time consuming because it involves sensing, storing and memory mapping of a plurality of frames. Further, since isochronous transfer is used in regard to low-resolution data at all times without performing bulk transfer, a preview image can be checked quickly.

The present invention is not limited to the above embodiments and various changes and modifications can be made within the spirit and scope of the present invention. Therefore, to apprise the public of the scope of the present invention, the following claims are made.

What is claimed is:

1. An image input apparatus comprising:
   an image data generating unit which generates high resolution image data if the image input apparatus is in a high-resolution image mode, and generates low resolution image data if the image input apparatus is in a low-resolution image mode;
   a data transfer unit which transfers the high resolution image data to an external device in an asynchronous or bulk transfer mode, and transfers the low resolution image data to the external device in an isochronous transfer mode; and
   a control unit which changes the low-resolution image mode to the high-resolution image mode, if an instruction for selecting the high-resolution image mode is received from the external device during the transfer of the low resolution image data.

2. The image input apparatus according to claim 1, wherein the low-resolution image data includes a moving image and the high-resolution image data includes a still image.

3. The image input apparatus according to claim 2, wherein said data transfer unit conforms to USB or IEEE 1394.

4. A method for transferring an image from an image input apparatus to an external device, comprising the steps of:
   generating high resolution image data if the image input apparatus is in a high-resolution image mode;
   generating low resolution image data if the image input apparatus is in a low-resolution image mode;
   controlling a data transfer unit so as to transfer the low resolution image data to the external device in an isochronous transfer mode if the image input apparatus is in the low-resolution image mode;

controlling the data transfer unit so as to transfer the high resolution image data to the external device in an asynchronous or bulk transfer mode if the image input apparatus is in the high-resolution image mode; and changing the low-resolution image mode to the high-resolution image mode, if an instruction for selecting the high-resolution image mode is received from the external device during the transfer of the low resolution image data.

5. The method according to claim 4, wherein the low-resolution image data includes a moving image and the high-resolution image data includes a still image.

6. The method according to claim 4, wherein the data transfer unit conforms to USB or IEEE 1394.

7. A computer readable medium having a computer program, the computer program causing a computer to perform a method for transferring an image from an image input apparatus to an external device, the method comprising the steps of:

generating high resolution image data if the image input apparatus is in a high-resolution image mode;

generating low resolution image data if the image input apparatus is in a low-resolution image mode;

controlling a data transfer unit so as to transfer the low resolution image data to the external device in an isochronous transfer mode if the image input apparatus is in the low-resolution image mode;

controlling the data transfer unit so as to transfer the high resolution image data to the external device in an asynchronous or bulk transfer mode if the image input apparatus is in the high-resolution image mode; and changing the low-resolution image mode to the high-resolution image mode, if an instruction for selecting the high-resolution image mode is received from the external device during the transfer of the low resolution image data.

8. The computer readable medium according to claim 7, wherein the low-resolution image data includes a moving image and the high-resolution image data includes a still image.

9. The computer readable medium according to claim 7, wherein the data transfer unit conforms to USB or IEEE 1394.

* * * * *